United States Patent [19]

Kawamura

[11] Patent Number: 4,934,837
[45] Date of Patent: Jun. 19, 1990

[54] BEARING STRUCTURE OF ROTARY MACHINE

[75] Inventor: Hideo Kawamura, Kanagawa, Japan

[73] Assignee: Isuzu Motors Limited, Tokyo, Japan

[21] Appl. No.: 408,009

[22] Filed: Sep. 15, 1989

[30] Foreign Application Priority Data

Oct. 21, 1988 [JP] Japan ................. 63-263990

[51] Int. Cl.$^5$ ............... F16C 33/66; F16C 33/62; F16C 33/76
[52] U.S. Cl. .................... 384/463; 384/477; 384/489; 384/492; 384/902; 384/907.1
[58] Field of Search ........... 384/462, 463, 477, 489, 384/492, 569, 902, 907, 907.1, 910, 279

[56] References Cited

U.S. PATENT DOCUMENTS

| | | | |
|---|---|---|---|
| 3,365,253 | 1/1968 | Haller | 384/902 X |
| 3,790,239 | 2/1974 | Laux et al. | 384/463 |
| 3,963,284 | 6/1976 | Bouchard | 384/492 X |
| 4,309,474 | 1/1982 | Hodes et al. | 384/907 X |
| 4,601,592 | 7/1986 | Jatczak et al. | 384/902 X |
| 4,634,300 | 1/1987 | Takebayashi et al. | 384/907 X |
| 4,770,549 | 9/1988 | Rokkaku et al. | 384/907.1 X |
| 4,848,934 | 7/1989 | Blakely et al. | 384/913 X |

FOREIGN PATENT DOCUMENTS 60-95124 5/1985 Japan.

*Primary Examiner*—Thomas R. Hannon
*Attorney, Agent, or Firm*—Browdy and Neimark

[57] ABSTRACT

This invention provides a bearing structure of a rotary machine wherein a shaft is supported on housings through rolling bearings made of a ceramic material, solid lubricants made of a powder lubricant of $CaF_2$, $Cr_2O_3$, etc., are disposed adjacent to and on both sides of the rolling bearings and seal rings are disposed between the shaft and the housings and on the sides of the solid lubricants. In a ultra-high speed rotary machine, this structure provides a bearing which is excellent in heat-resistance, deformation resistance, wear resistance and durability. The temperature of the bearing structure is raised as a whole to a high temperature without cooling the housings to provide solid lubrication by the solid lubricants, and to reduce drastically frictional resistance. The frictional resistance is further reduced under a high temperature condition to attain low friction and to drastically reduce the wear quantity of the bearing. Moreover, since this bearing structure does not use oil lubrication, an oil lubrication system can be eliminated and hence the occurrence of a fire due to high temperature can be eliminated.

8 Claims, 1 Drawing Sheet

BEARING STRUCTURE OF ROTARY MACHINE

BACKGROUND OF THE INVENTION

1. Field of the Invention

This invention relates to a bearing structure of a rotary machine such as a turbo-charger, an energy recovery apparatus, and the like.

2. Description of the Prior Art

An exhaust dynamo apparaus consisting of an exhaust turbine driven by exhaust energy of an internal combustion engine and a dynamo driven by the exhaust turbine is heretofore known from Japanese Patent Laid-Open No. 95124/1985, for example. This exhaust dynamo apparatus comprises an exhaust turbine actuated by exhaust energy of an internal combustion engine and a dynamo driven by the exhaust turbine, and a turbine blade shaft of the exhaust turbine and a rotor shaft of the dynamo are connected on the same axis. The turbine blade shaft and the rotor shaft are made of a ceramic material and the rotor shaft is supported on housings through a fixed bearing, an oil float bearing and a thrust bearing. The bearing for supporting rotatably the rotor shaft employ fluid lubrication.

Generally, the shaft to which the exhaust turbine operated by exhaust energy of an internal combustion engine is fitted rotates at an extremely high speed. The rotating speed of the shaft of a turbo-charger or energy recovery apparatus equipped with the exhaust turbine, for example, is as high as 100,000 to 150,000 r.p.m. The turbine blade itself of the exhaust turbine is exposed to the high temperature exhaust gas and the shaft connected to the turbine blade shaft also attains a high temperature state. The bearing portion for supporting the shaft of such a ultra-high speed rotary machine relies more heavily on fluid lubrication by a liquid lubricant such as oil than on boundary lubrication which depends on a friction coefficient. However, even in a rotary member using fluid lubrication, its friction is great and a considerable quantity of oil must be fed into the bearing in the case of components such as the turbo-charger which are exposed to the high temperature. In the case of fluid lubrication using oil, quite a complicated oil seal having high sealing property must be used in order to prevent the leak of the oil, and various functional components such as oil pipes, oil drains, and the like, are necessary. In the ultra-high speed rotary machine such as the turbo-charger or the energy recovery apparatus, however, the place at which the rotary shaft is to be supported on the housings is positioned at an extremely inconvenient position.

The problems described above can be solved if ball bearings made of a ceramic material can be used for this ultra-high speed rotary machine. Even if the ball bearing is made of a ceramic material, particularly silicon nitride, friction becomes remarkable if no lubricant at all exists, because it supports the rotary shaft which rotates at an extremely high rotating speed.

Incidentally, the lubrication characteristics of solid lubrication by solid lubricants such as $CaF_2$, $Cr_2O_3$, etc, and liquid lubrication by liquid lubricants such as oil are affected greatly by temperatures and large differences exist between them. As shown in FIG. 2, when the temperature T is low, the friction coefficient $\mu$ is great for solid lubrication but when the temperature T rises, the friction coefficient $\mu$ drops. With liquid lubrication, on the other hand, the friction coefficient $\mu$ is low when the temperature is low but as the temperature T rises, the friction coefficient $\mu$ increases drastically. For instance, the friction coefficient $\mu$ is 0.2 at 300° C. for liquid lubrication but the friction coefficient $\mu$ for solid lubrication is about twice that of liquid lubrication at 300° C. When the temperature is 600° C., however, the friction coefficient $\mu$ is 0.2 for solid lubrication but it becomes several times for liquid lubrication.

SUMMARY OF THE INVENTION

The present invention is directed to solve the problems described above, and to provide a bearing which is excellent in heat resistance, deformation resistance, wear resistance, durability, and the like, by assembling rolling bearings made of a ceramic material such as silicon nitride, silicon carbide, etc between a shaft rotating at a ultra-high speed and under a high temperature condition and housings in order to support rotatably the shaft on the basis of the concept that the friction coefficient $\mu$ for lubrication using a solid lubricant drops with a temperature rise as described above in contrast to lubrication using a liquid lubricant. Moreover, the present invention is directed to provide a bearing structure of a rotary machine which sets the temperature of the structure to a high temperature as a whole without cooling the housings, effects solid lubrication by a solid lubricant, reduces drastically the frictional resistance, further reduces the frictional resistance under the high temperature condition to attain low friction and to reduce drastically wear of the bearing and moreover, eliminates the occurrence of a fire due to the high temperature because an oil lubrication system is eliminated by use of a structure free from oil lubrication.

It is another object of the present invention to provide a bearing structure of a rotary machine which supports rotatably the shaft on the housings through rolling bearings made of a ceramic material such as silicon nitride ($Si_3N_4$), silicon carbide (SiC), or the like, disposes solid lubricants composed of a powder lubricant such as $CaF_2$, $Cr_2O_3$, or the like, on both sides of the rolling bearings and disposes seal means between the shaft and the housings and on the sides of the solid lubricants.

Since the bearing structure of a rotary machine in accordance with the present invention is constructed as described above, the rolling bearings can be lubricated sufficiently even when the shaft rotates at a high speed under the high temperature condition and since the friction coefficient drops more greatly for solid lubrication than for liquid lubrication when the bearing portion attains a high temperature, the most desirable lubricating operation can be exhibited under the high temperature condition. Thus, the present invention can provide a bearing structure of a rotary machine which minimizes a wear quantity under the condition where the solid lubricant exists, and which has high durability. Moreover, this bearing structure of a rotary machine does not employ fluid lubrication and does not either require any oil. Accordingly, the rolling bearings and the solid lubricant can be sealed by seal rings having a simple structure for seal means. Since components and devices of oil supply means such as oil pipes, oil drains, and the like, are not necessary, the lubrication structure is simple and compact and does not require a large space. Accordingly, a sufficient lubrication function can be obtained by merely disposing the solid lubricants at the portions having a severe space requirement, that is, in the narrow space. Therefore, the bearing structure of a rotary machine can form easily the bearing itself and the lubrication system, and fitting and removal and maintenance of the bearing and the solid lubricants can be conducted easily.

In the bearing structure of a rotary machine described above, it is still another object of the present invention to provide a bearing structure of a rotary machine which forms the solid lubricants by a powder lubricant such as $CaF_2$, $Cr_2O_3$, or the like, lets a porous member such as a porous metallic material or a porous ceramic material be impregnated with the powder lubricant such as $CaF_2$ or $Cr_2O_3$, fits the porous member to the housings with clearance with respect to the shaft, makes it possible to handle easily the solid lubricants and to dispose them easily to predetermined portions, and can supply gradually the powder lubricants into the rolling bearings due to the rotary motion of the shaft and to the oscillation of the shaft, the housings, and the like.

In the bearing structure or a rotary machine described above, it is still another object of the present invention to provide a bearing structure of a rotary machine which forms the rolling bearings by a ball bearing, constitutes the balls, the inner and outer races constituting the ball bearing by a ceramic material such as silicon nitride ($Si_3N_4$), silicon carbide (SiC), or the like, reduces drastically the frictional resistance because friction occurring between the shaft and the ball bearing is rolling friction occurring between the balls and each race and can drastically reduce the wear quantity of the bearing.

It is a further object of the present invention to apply the bearing structure of a rotary machine described above to a bearing which supports rotatably a shaft fitted to a turbine blade of an exhaust turbine driven for rotation by exhaust energy of an engine on housings. In other words, the present invention contemplates to provide a bearing structure of a rotary machine which can accomplish a sufficient lubrication function and is adapted to ultra-high speed rotation and high temperature conditions by merely disposing the solid lubricants described above under the extremely severe space requirement condition because the friction coefficient of the solid lubricants becomes smaller at a high temperature than that of fluid lubrication even when the turbine blade of the exhaust turbine in a turbo-charger or energy recovery apparatus disposed in the engine receives the heat from the exhaust gas, attains a high temperature and makes the high speed rotation.

DESCRIPTION OF THE PREFERRED EMBODIMENT

Hereinafter, a bearing structure of a rotary machine in accordance with one embodiment of the present invention will be described in detail with reference to the accompanying drawings.

Figure 1:
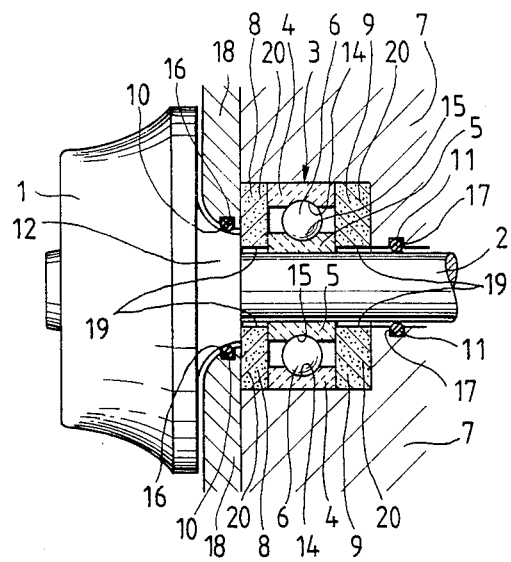
FIG. 1 is a sectional view showing a bearing structure of a rotary machine in accordance with the present invention.
Figure 2:
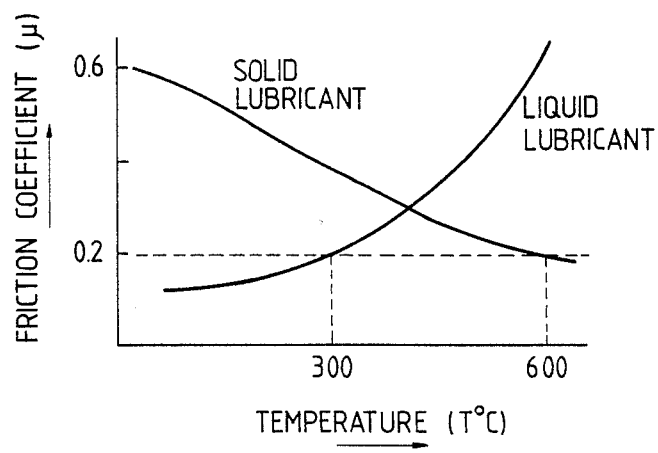
FIG. 2 is a diagram showing the relation of friction coefficients of a solid lubricant and a liquid lubricant with a temperature.

FIG. 1 shows a bearing structure of a rotary machine, such as a turbo-charger, an energy recovery apparatus, or the like, for supporting a shaft 2 fitted to a turbine blade 1 of an exhaust turbine that is mounted to an engine. The turbine disposed in the rotary machine is assembled in the exhaust system of the engine and the shaft 2 as the rotary member of the rotary machine rotates at a ultra-high speed. The turbine blade 1 of the turbine is fixed to one of the ends of the shaft 2 either directly or through a turbine blade shaft 12. Though the entire construction of the turbo-charger or energy recovery apparatus is not shown in the drawing, the turbo-charger, for example, converts the exhaust gas energy of the engine to the rotation of the blade of the turbine, drives a compressor and supercharges the supply to the engine. On the other hand, the energy recovery apparatus converts the exhaust energy of the engine to the rotation of the blade of the turbine and recovers it as electric energy. Therefore, it is equipped with a dynamo-motor. In the rotary machine such as the turbo-charger or energy recovery apparatus described above, one of the ends of the shaft 2 is fixed to a turbine blade shaft 12 equipped with the turbine blade 1 of the exhaust turbine, for example, the shaft 2 is supported rotatably on a housing 7 by a pair of bearings, the impeller of a compressor for sending the intake air into the engine is fitted to the other end of the shaft 2 and a dynamo-motor consisting of a rotor of a permanent magnet and a stator of a coil or the like is disposed on the shaft 2 between the bearings and the impeller. In this rotary machine, at least one of the bearings which is positioned on the turbine blade 1 side is composed of a rolling bearing. Moreover, this bearing supports rotatably the shaft 2 on the housing 7 between the turbine blade 1 and the dynamo-motor. FIG. 1 shows only the rolling bearing positioned on the turbine blade 1 side among the rolling bearings that support rotatably the shaft 2 on the housing 7. This ultra-high speed rotary machine functions occasionally only as the energy recovery apparatus and has a structure wherein a compressor having the function of sending the intake air into the internal combustion engine such as the one disclosed in the aforementioned reference Japanese Patent Laid-Open No. 95124/1985 is not disposed.

In the rotary machine such as the turbo-charger or energy recovery apparatus, the shaft 2 is rotated at a ultra-high speed of 100,000–200,000 r.p.m. by the exhaust energy of the internal combustion engine. In the bearing structure of the rotary machine in accordance with the present invention, the shaft 2 rotating at a ultra-high speed is made of a metal material or a ceramic material, the rolling bearing supported on the metallic housing 7 consists of a ball bearing 3 and this ball bearing 3 is made of a ceramic material such as silicon nitride, silicon carbide, or the like. Moreover, the ball bearing 3 consists of an inner race 5 fixed to the shaft 2, an outer race 4 fixed to the housing 7 and a large number of balls 6 as the rolling member disposed between the inner race 5 and the outer race 4. An orbit groove 15 is defined on the outer peripheral surface of the inner race 5 and another orbit groove 14 is defined on the inner peripheral surface of the outer race 4. The balls 6 roll between each orbit groove 14, 15. The outer race 4, inner race 5 and balls 6 in the ball bearing 3 are particularly produced by use of ceramics such as silicon nitride ($Si_3N_4$), silicon carbide (SiC), or the like. Since this bearing structure of the rotary machine consists of the ceramic ball bearing 3 as described above, it is not necessary to provide fluid lubrication by use of a liquid lubricant such as an oil and hence oil seal is not necessary, either. Accordingly, various functional components such as oil pipes, oil drains, etc, can be eliminated from the bearing structure. For these reasons, the bearing structure of the rotary machine of the invention can simplify the structure of the bearing itself and can easily assemble the ball bearing 3 even in a small area as when the space of the ultra-high speed rotary machine is limited.

Although the ball bearing 3 is made of the ceramic material in the bearing structure of the rotary machine in accordance with the present invention as described above, friction would occur on the ball bearing 3 and an undesirable state would be invited if no lubricant at all is supplied. Therefore, the bearing structure of the rotary machine of the present invention uses solid lubricants 8, 9 for lubricating the ball bearing 3. Powder lubricants such as $CaF_2$, $Cr_2O_3$ and the like are preferred as the solid lubricants 8, 9 and they have the structure wherein a porous member 20 such as a porous metallic material or a porous ceramic material is allowed to be impregnated with the powder lubricant. The porous member 20 impregnated with and burying therein the solid lubricants 8, 9 is set under a desired state having a clearance 19 with respect to the shaft 2 and is stored and assembled in the space defined between the housing 7 and the ball bearing 3 and in the space defined between the housing 18 and the ball bearing 3. Furthermore, seal rings 10, 11 as seal means are disposed between the shaft 2 and the housings 7 and 18 on both sides of the ball bearing 3 and the solid lubricants 8, 9. Accordingly, if a structure is employed wherein the powder lubricant of $CaF_2$, $Cr_2O_3$, etc. is contained in the porous member 20 such as the porous metallic material or in the porous ceramic material and is stored in the housings, the powder lubricant is gradually discharged from the porous member due to the rotary motion of the shaft 2 of the rotary machine, the inner race and the ball 6 and due to the oscillation of the shaft 2, the ball bearing 3 and the housing 7, and is supplied to the relative motion portion of the ball bearing 3. Accordingly, the ball bearing 3 is lubricated sufficiently and reliably by the solid lubricants 8, 9. In other words, when this rotary machine is applied to the energy recovery apparatus, the housings 7, 18 attain a high temperature because they are not cooled. However, the solid lubricants 8, 9 can exhibit their most desirable lubricating functions under the high temperature condition and the friction quantity under the condition where the solid lubricants 8, 9 exist between the relative rotary members of the rotary machine becomes extremely small so that a bearing having excellent durability can be provided for the ultra-high speed rotary machine. Since the frictional resistance of the rolling bearing itself is rolling friction in comparison with a sliding bearing, it can be reduced drastically and the wear quantity of the bearing itself can be reduced drastically, too.

The seal rings 10, 11 disposed on both sides of the solid lubricants 8, 9 can be assembled by fitting them into the annular groove 17 formed on the metallic housing 7 and into the annular groove 16 formed on the housing 18. In the drawing, the sealing ring 10 on the side of the turbine blade 12 is shown positioned between the housing 18 and the turbine blade shaft 12, this structure is not particularyly limitative and it may be disposed between the shaft 2 and the housing 7. Needless to say, the turbine blade shaft 12 shown in the drawing may have an unitary structure with the shaft 2.

What is claimed is:

1. A bearing structure of a rotary machine comprising:
    a rotatable shaft;
    rolling bearings made of a ceramic, for supporting rotatably said shaft;
    housings for supporting said shaft rotatable on said rolling bearings;
    solid lubricants disposed adjacent to and on both sides of said rolling bearings and fitted to said housings; and
    seal means disposed between said shaft and said housings and arranged on the sides of said solid lubricants, for sealing said rolling bearings and said solid lubricants.

2. The bearing structure of a rotary machine as defined in claim 1, wherein said ceramics forming said rolling bearing is silicon nitride.

3. The bearing structure of a rotary machine as defined in claim 1, wherein said ceramics forming said rolling bearing is silicon carbide.

4. The bearing structure of a rotary machine as defined in claim 1, wherein said rolling bearing consists of a ball bearing, and balls, an inner race and an outer race constituting said ball bearing are made of a ceramic material.

5. A bearing structure of a rotary machine comprising:
    a rotatable shaft;
    rolling bearings made of a ceramic, for supporting rotatably said shaft;
    housings for supporting said shaft rotatable on said rolling bearings;
    porous members disposed adjacent to and on both sides of said rolling bearings and fitted to said housings with clearance with respect to said shaft;
    solid lubricants contained in said porous members; and
    seal means disposed between said shaft and said housings and arranged on the sides of said solid lubricants, for sealing said rolling bearings and said solid lubricants.

6. The bearing structure of a rotary machine as defined in claim 5, wherein said solid lubricant is a powder lubricant of $CaF_2$.

7. The bearing structure of a rotary machine as defined in claim 5, wherein said solid lubricant is a powder lubricant of $Cr_2O_3$.

8. A bearing structure of a rotary machine comprising:
    a turbine blade of an exhaust turbine driven for rotation by exhaust energy of an engine;
    a rotatable shaft fitted to said turbine blade;
    rolling bearings made of ceramics, for supporting rotatably said shaft;
    housings for supporting said shaft rotatable on said rolling bearings;
    solid lubricants disposed adjacent to and on both sides of said rolling bearings and fitted to said housings; and
    seal means disposed between said shaft and said housings, and arranged on the sides of said solid lubricants, for sealing said rolling bearings and said solid lubricants.

* * * * *